S. DAY.
LIGHT FOR VEHICLE CURTAINS.
APPLICATION FILED FEB. 6, 1919.

1,303,777.

Patented May 13, 1919.

Inventor
Samuel Day
by Chas. J. Williamson
Atty.

UNITED STATES PATENT OFFICE.

SAMUEL DAY, OF BRIDGETON, NEW JERSEY.

LIGHT FOR VEHICLE-CURTAINS.

1,303,777.

Specification of Letters Patent.

Patented May 13, 1919.

Application filed February 6, 1919. Serial No. 275,353.

*To all whom it may concern:*

Be it known that I, SAMUEL DAY, of Bridgeton, New Jersey, have invented a certain new and useful Improvement in Lights for Vehicle-Curtains, and do hereby declare that the following is a full, clear, and exact description thereof.

My invention relates to means for attaching lights, of glass or other transparent material, to vehicle covers, such as automobile tops and my object is to provide an attaching means which will combine the important qualities of constituting a firm connection with the curtain, a sufficiently yielding or cushioned support for the glass, etc., which will prevent breakage from the shocks or jars to which it is apt to be subjected, and which can be easily and quickly removed and replaced and without any special skill being required in so doing, and with this object in view, my invention consists in the light-attaching means for vehicle curtains, constructed substantially as hereinafter specified and claimed.

In the annexed drawings:—

Figure 1:
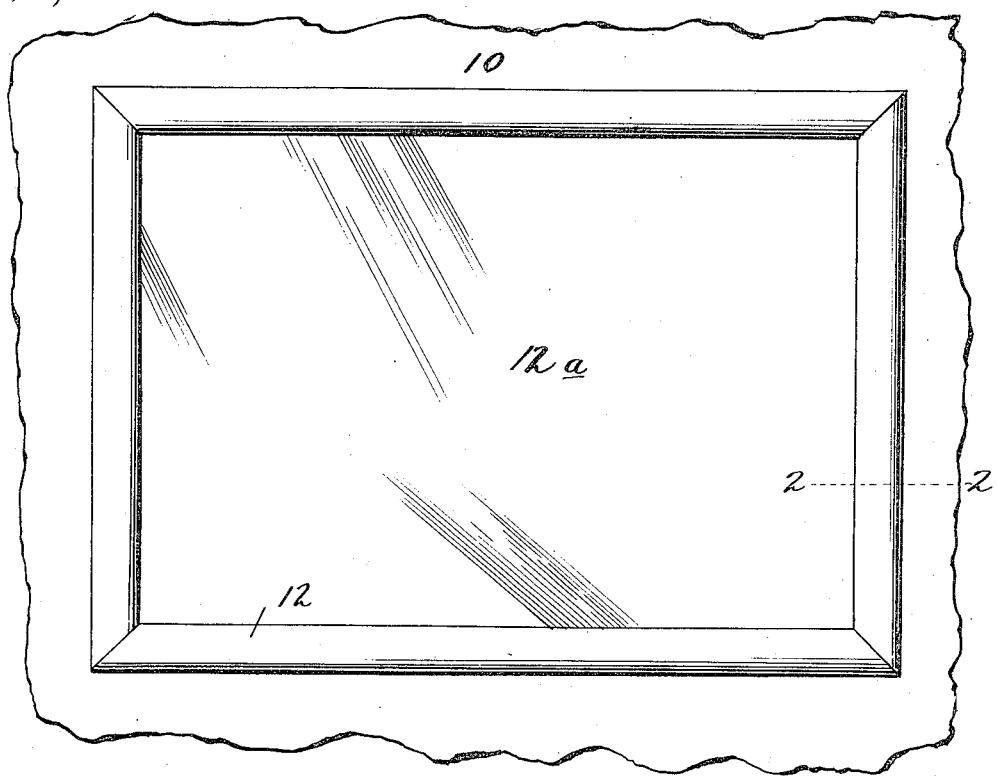
Figure 1 is a view in elevation of a portion of a vehicle curtain and its light, with my invention applied thereto.
Figure 2:
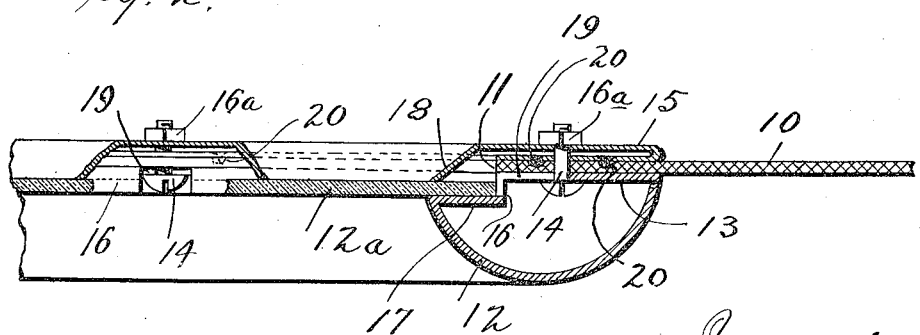
Fig. 2 is a cross section on the line 2—2 of Fig. 1.

Referring to the drawings, 10 designates the curtain, of flexible material having, as shown, a rectangular hole 11 for the light of glass, mica or other transparent material. The marginal portion of the curtain around the hole is confined between the inner and outer members, of a frame that is of rectangular contour, which members reach beyond the edge of the hole and receive and clamp between them, the marginal edge of the pane or plate 12ª of glass, etc. Both frame members are of sheet metal, and each, on its inner, curtain-engaging face is flat and thus has an extended bearing against the curtain by which it is supported or reinforced most efficiently. The outer member 12 has an outer wall that arches outward in a simple curve from its flat, inner, curtain engaging wall 13, and this is tubular or hollow to secure lightness and as well conceal the heads of the bolts 14 which pass through alining holes in the inner wall 13, and inner member 15, as well as in the curtain. A nut 16ª is on the protruding inner end of each bolt. The outer member 12 on its inner edge has a pane-receiving groove which is formed by a lateral, outward bend 16 that forms a supporting seat or shoulder for the pane, which on its outer side is overhung by the thus-offset portion 17 of the inner flat wall of said outer member. On its inner face said pane, opposite said offset portion 17 is engaged by the more or less elastic lip 18 on the inner frame member 15. The inner frame member is of sheet metal doubled, or folded over upon itself to produce two thicknesses, and the lip 18 extends from the outer thickness at an incline, and the edge of the inner thickness is situated at or near the point of junction of the lip with the outer thickness. It will, therefore, be evident that the pane is held with a gentle, yielding pressure, and yet it is securely confined in its seat between the two frame members.

The holes in the outer frame member 12 for the bolts, are each in the form of a slot 19 cut through the seat-forming bend 16, and through the contiguous portion of the flat inner wall of said outer member 12.

Preferably, to add to the security of the hold on the portion of the curtain between the frame members, the inner member, and in its thickness next to the curtain can be provided with spurs 20 formed by a prick-punch, which will enter or penetrate the curtain when the two members are clamped thereto by the bolts.

Obviously, with my frame, the application and removal of the pane is a matter of but a few minutes time; it can be done easily; and when the pane is secured, it is gently but firmly held; and the frame is securely and stoutly clamped to the curtain, which latter, by reason of the extended bearings of the frame members on both sides, is not in danger of being torn from the strain of the frame and the glass thereon.

I claim:—

1. The combination of a vehicle curtain having a hole, a frame comprising inner and outer members engaging opposite sides of the marginal portion of the curtain about said hole, each of said members having a continuous, flat, curtain engaging wall, one member being hollow and having an offset portion forming a pane-receiving groove and support, and the other member having a yieldable lip that engages the side of the pane opposite said groove, and fastening devices connecting the inner wall of the hollow member and the inner frame member and situated in holes in said inner wall and said inner frame member.

2. The combination of a vehicle curtain having a hole, a frame comprising inner and outer members engaging opposite sides of the marginal portion of the curtain about said hole, each of said members having a continuous, flat curtain engaging wall, one member being hollow and having an offset portion forming a pane-receiving groove and support, and the other member being of sheet metal and folded to form two thicknesses and having a yieldable lip that engages the side of the pane opposite said groove, and bolts passing from within the hollow member and through the inner wall thereof and through the curtain and through the inner frame member.

In testimony that I claim the foregoing I have hereunto set my hand.

SAMUEL DAY.